C. E. MAHAN.
ANTISKID DEVICE FOR AUTOMOBILE WHEELS.
APPLICATION FILED AUG. 1, 1918.
1,339,963.
Patented May 11, 1920.
2 SHEETS—SHEET 1.
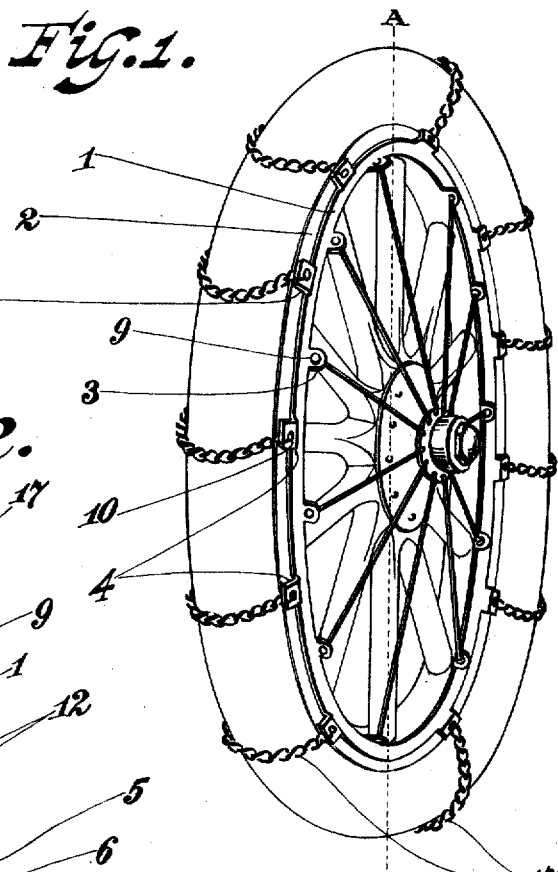
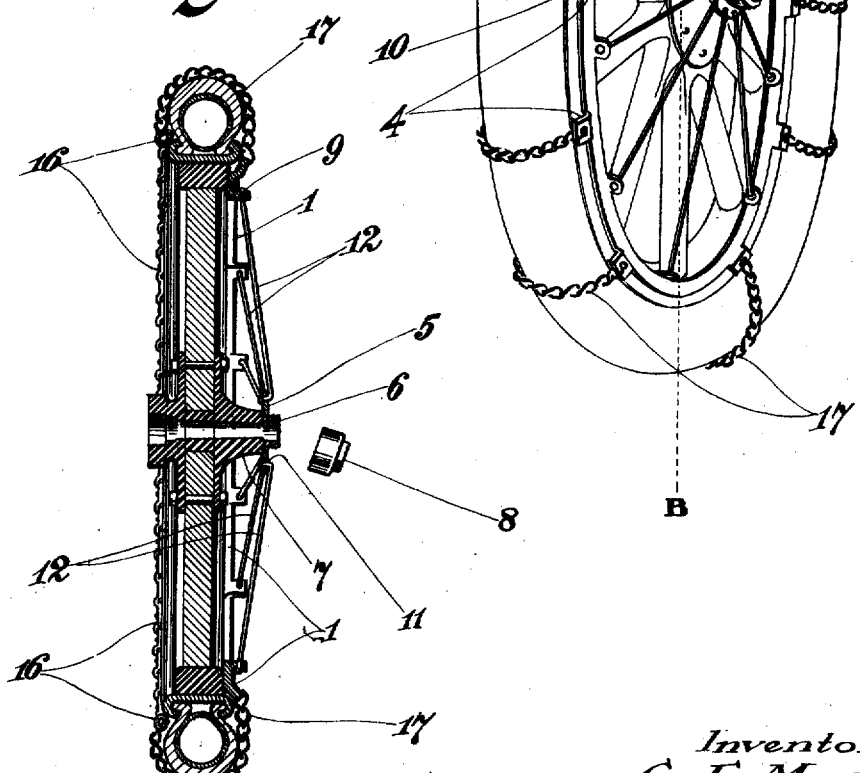
Inventor
C. E. Mahan
by Adam E. Fisher
Attorney.

C. E. MAHAN.
ANTISKID DEVICE FOR AUTOMOBILE WHEELS.
APPLICATION FILED AUG. 1, 1918.
1,339,963.
Patented May 11, 1920.
2 SHEETS—SHEET 2.
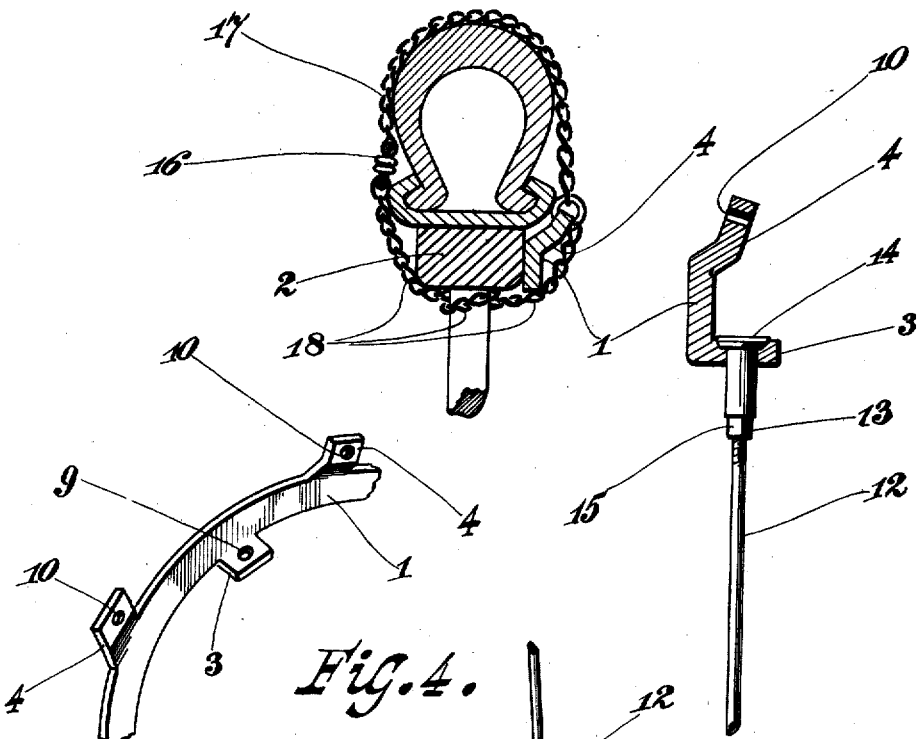
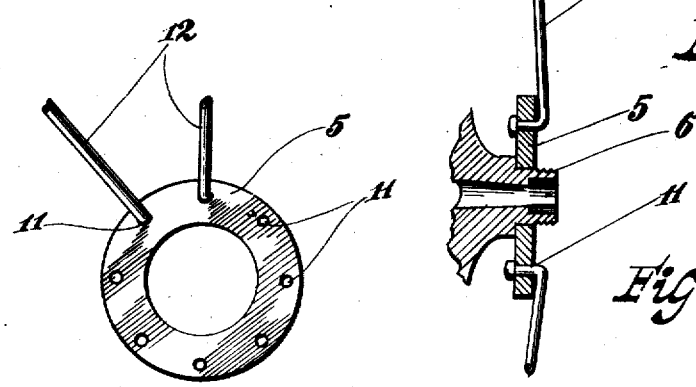
Inventor
C. E. MAHAN
by Adam E. Fisher
Attorney.

UNITED STATES PATENT OFFICE.

CHANCY E. MAHAN, OF SHELBYVILLE, ILLINOIS.

ANTISKID DEVICE FOR AUTOMOBILE-WHEELS.

1,339,963.   Specification of Letters Patent.   Patented May 11, 1920.

Application filed August 1, 1918. Serial No. 247,856.

*To all whom it may concern:*

Be it known that I, CHANCY E. MAHAN, a citizen of the United States, residing in the city of Shelbyville and State of Illinois, have invented new and useful Improvements in Antiskid Devices for Automobile-Wheels, of which the following is a specification, reference being had to the accompanying drawings.

This invention pertains to anti-skid devices for the wheels of automobiles, and for the purpose of facilitating the progress of automobiles along muddy and rutted roadways, and has for its object the production of a device for this purpose constructed in a simple, practical and efficient form.

Referring to the drawings constituting a part of this specification,

Figure 1 is a perspective view of an automobile wheel equipped with my improved apparatus;

Fig. 2 is a transverse sectional view taken along the line A—B in Fig. 1;

Fig. 3 is a detail transverse sectional view showing the method of attaching the anchor chains;

Fig. 4 is a fragmentary perspective view showing the method of constructing the outer rim ring;

Fig. 5 is a detail sectional view illustrating the manner of adjustably connecting the outer ends of the stay rods to the rim ring.

Fig. 6 is a detail sectional view illustrating the manner of mounting the hub ring.

Fig. 7 is a detail elevation of the hub ring and a portion of the spokes.

Referring more particularly to the drawings, my invention consists of an outer rim ring 1 adapted to lie close along and around the outer side of the ordinary tire rim 2, and is formed to fit snugly against said rim. This outer rim ring 1 is provided at spaced distances around the same with a plurality of laterally projecting ears 3, and with a plurality of projecting ears 4, both series being pierced with holes as at 9 and 10. The ears 4 which extend laterally and outwardly at an inclination or angle, are of angular formation as clearly illustrated in Fig. 5 of the drawings. A hub ring 5 is adapted to fit snugly over the outer end of the spindle 6, and between the hub 7 and the hub cap 8. This hub ring 5 is, likewise, pierced with a plurality of holes 11 in substantially radial alinement with the holes 9 in the laterally projecting ears of the rim ring 1.

A plurality of auxiliary spokes or stay rods 12 extend between the laterally projecting ears 3 and the hub ring 5, said stay rods being bent at an angle at their inner ends to pass through the holes 11 formed in the hub ring 5, and are riveted in this position, or otherwise suitably fastened. The outer ends of said stay rods 12 are provided with suitable adjustment nuts 13 which pass through the holes 9, and threadedly engage the outer ends of said stay rods 12. The adjustment nuts 13 are provided with flange heads 14 to prevent the same from pulling through the holes 9 and are flattened at opposite sides of their shanks as at 15 to afford means for turning the same.

Upon the opposite side of the wheel from the said outer rim ring 1 is arranged the stay chain 16. A plurality of anti-skid chains 17 are hooked at their outer ends through the holes 10 of the upstanding ears 4, and at their inner ends to said stay chain 16. A plurality of anchor chains 18 are looped through the wheel under the tire rim 2, and are hooked at their ends to the anti-skid chains 17, but any other suitable fastening means may, of course, be employed for this purpose.

In operation, with an automobile wheel so equipped with my apparatus as aforesaid, it is found that the auxiliary spokes or stay rods 12 greatly facilitate the progress of the vehicle through muddy roads, as these stay rods press against the sides of the ruts, thereby imparting progressive motion to the wheel. The anchor chains prevent the sliding of the device along the tire and the whole apparatus likewise affords a very efficient anti-skid device.

While I have herein described a certain specific manner and method of constructing the elements of my invention, it is understood that I may vary from the same in minor details, not departing from the spirit of my invention, so as best to construct a practical device for the purpose intended, as defined in the appended claims.

What I claim to be new and patentable is:

1. An anti-skid device for automobile wheels comprising a rim ring located at the outer face of the wheel, an annular stay chain arranged at the inner face of the wheel, anti-skidding means extending across the tire of the wheel and connecting the rim ring and the stay chain and means for securing the ring and the stay chain to the wheel.

2. An anti-skid device for automobile wheels presenting a rim ring located at the outer face of a wheel, an annular stay chain arranged at the inner face of the wheel, anti-skidding means extending across the tire of the wheel and connecting the rim ring and the stay chain, a hub ring and tensioning means, including radially arranged rods connecting the hub ring and the rim ring.

3. An anti-skid device for automobile wheels, comprising a rim ring located at the outer face of the wheel, a hub ring also located at the outer face of the wheel and plurality of stay rods connecting the said rings and means for anchoring the device to the wheel.

4. An anti-skid device for automobile wheels comprising a rim ring arranged at the outer face of the wheel adjacent to the tire rim and provided with a plurality of spaced laterally projecting ears, a hub ring located at the outer face of the wheel and provided with openings, a plurality of stay rods arranged in the openings of the hub ring and connected with the ears of the rim ring and provided with tensioning means, a stay chain located at the inner face of the wheel and parallel the rim ring, and a plurality of anti-skid chains extending across the tire and connecting the rim ring and the stay chain.

5. An anti-skid device for automobile wheels comprising a rim ring located at the outer face of the wheel adjacent to the tire rim and provided at its inner and outer edges with projecting ears, a hub ring located at the outer face of the wheel, a plurality of stay rods connected at their inner ends to the hub rings, and provided at their outer ends with means for securing them to the ears at the inner edge of the rim ring, a substantially annular stay chain located at the inner face of the wheel, and a plurality of anti-skid chains extending across the tire of the wheel and connected to the ears at the outer edge of the rim ring and to the stay chain.

6. An anti-skid device for automobile wheels, comprising a rim ring located at the outer face of the wheel, a hub ring, a plurality of stay rods connecting the said rings, means for anchoring the device on the wheel, means for tensioning the said rods.

CHANCY E. MAHAN.

Witnesses:
J. C. WILLARD,
S. B. CARR.